United States Patent Office 3,574,795
Patented Apr. 13, 1971

3,574,795
CATIONIC ADDITION OF DIHYDROCARBYL THIOPHOSPHORIC ACIDS TO CONJUGATED DIENES AND PRODUCT
Alexis A. Oswald, Mountainside, Wolfgang H. Mueller, Elizabeth, and Francis A. Daniher, Westfield, N.J., assignors to Esso Research and Engineering Company
No Drawing. Filed May 22, 1967, Ser. No. 640,355
The portion of the term of the patent subsequent to Sept. 5, 1984, has been disclaimed
Int. Cl. C07f 7/16; C07d 105/04; A01n 9/36
U.S. Cl. 260—956                                  17 Claims

ABSTRACT OF THE DISCLOSURE

Dihydrocarbyl dithiophosphoric and monothiophosphoric acids add to conjugated dienes in acid media by a cationic addition mechanism; the monoadducts formed thereby are useful as pesticides and lubricating oil additives.

FIELD OF INVENTION

This invention relates to the preparation of novel organophosphorus compounds. More particularly, this invention relates to the cationic addition of dihydrocarbyl dithiophosphoric and monothiophosphoric acids to conjugated dienes, in acid media, to form novel monoadducts, i.e., O,O'-dihydrocarbyl-S-allyl dithiophosphates and monothiophosphates, useful as pesticides and as lubricating oil additives.

PRIOR ART

The addition of O,O-dihydrocarbyl dithiophosphoric acids to unsaturated compounds is known to produce esters of dithiophosphoric acid (Houben-Weil, Methoden der Organischen Chemie, vol. XII/2, Organische Phosphor-Verbindungen, pages 709–720, Ed. E. Mueller, Publ. G. Thieme Verlag, Stuttgart, Germany, 1964). Some of these adducts possess properties which make them suitable as lubricating oil additives and agricultural chemicals, e.g., pesticides, fungicides, insecticides. The importance of selected members of this group has stimulated interest in other organophosphorus compounds which may possess comparable properties and in methods for preparing these compounds.

It has previously been disclosed that O,O'-dihydrocarbyl dithiophosphoric and monothiophosphoric acids add to olefinic compounds, i.e., monoolefins, multiolefins, conjugated diolefins, by free radical addition mechanisms. See copending U.S. applications, Ser. No. 312,302 filed Sept. 30, 1963, which issued as Pat. 3,340,332 on Sept. 5, 1967 and Ser. No. 522,825 filed Jan. 25, 1966 which issued as Pat. 3,483,278 on Dec. 9, 1969. However, these processes require the use of free radical initiators, e.g., ultraviolet light, gamma irradiation, chemical-free radical initiators such as peroxides, etc. in order to prepare monoadducts in high yields. Nevertheless, it has now been found that monoadducts of conjugated dienes with dihydrocarbyl thiophosphoric acid may be prepared in exceedingly high yields by a cationic addition mechanism promoted by an acid medium. These novel, cationic additions are unexpectedly free from undesirable side reactions. For example, conjugated dienes do not polymerize in the acidic medium and the double bond of the allylic phosphate ester monoadducts does not react further with thiophosphoric acid even when the latter is used in excess. Thus, the process of the present invention is surprisingly suited for preparation and recovery of the monoadducts formed herein.

SUMMARY OF THE INVENTION

Thus, in accordance with this invention, a thiophosphoric acid having the generic formulae:

(I) 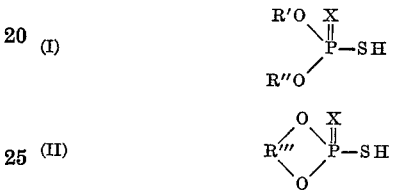

(II) 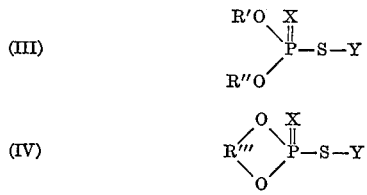

wherein X is sulfur or oxygen, R' and R'' are each $C_1$–$C_{30}$ monovalent hydrocarbyl radicals, e.g., alkyl, alkenyl, aryl, alicyclic, and substituted derivatives thereof, which also may contain nitrogen, halogen, or alkyl-mercapto groups, and R''' is a divalent $C_1$–$C_{30}$ hydrocarbyl radical, is reacted with a conjugated diolefin, open chain or cyclic, preferably open chain, in an acidic liquid phase, cationic addition reaction, thereby forming compounds that can be described as having the formulae:

(III) 
$$\begin{array}{c}R'O\phantom{X}X\\ \phantom{R'O}\diagdown\phantom{X}\|\\ \phantom{R'O}P-S-Y\\ \phantom{R'O}\diagup\\ R''O\end{array}$$

(IV)
$$\begin{array}{c}\phantom{R'''}O\phantom{X}X\\ \phantom{R'''}\diagup\phantom{X}\|\\ R'''\phantom{O}P-S-Y\\ \phantom{R'''}\diagdown\phantom{X}\diagup\\ \phantom{R'''}O\end{array}$$

wherein R', R'', R''', and X are as described and Y is the allylic unsaturated radical resulting from the addition of a diene to the thiophosphoric acid. The cationic addition mechanisms lead to the preparation of monoadducts of a somewhat different structure than is prepared by free radical addition reactions. Thus, for example, the following discussion will illustrate the structural difference obtained when various conjugated diolefins are reacted with a thiophosphoric acid under free radical and cationic conditions:

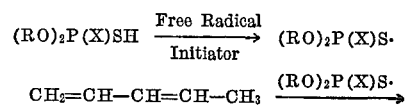

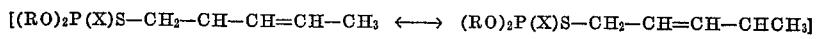

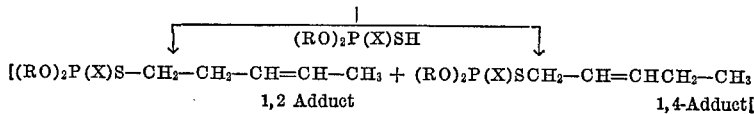

In this case comparable quantities of the two isomeric adducts are formed since both of the allylic carbon atoms of the intermediate radical are secondary. In other cases, hydrogen abstraction by the radical occurs selectively at the less substituted allylic carbon so as to provide the thermodynamically more stable allylic dithiophosphate isomer. For example, isoprene yields mainly the 1,4-adduct:

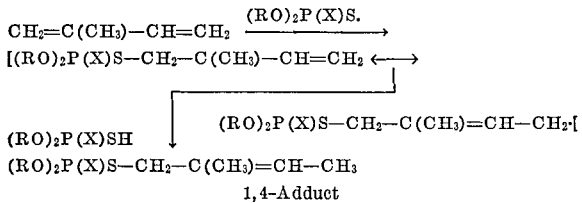

However, the common intermediates of the cationic addition reactions claimed in this invention are allylic cations formed by the addition of a proton to the conjugated diene. This addition again occurs at the less substituted end of the conjugated diene so as to yield the more stable allylic cation. For example, in the case of piperylene, cationic addition takes place in the following manner:

$$CH_2=CH-CH=CH-CH_3 \xrightarrow{H^+}$$

$$[H_3C-\overset{+}{C}H-CH=CH-CH_3 \longleftrightarrow H_3C-CH=CH-\overset{+}{C}H-CH_3]$$

Equivalent resonance forms of allylic cation $(RO)_2P(X)SH$ $(RO)_2P(X)SCH-CH=CH-CH_3$
$\quad\quad\quad | $
$\quad\quad\quad CH_3$ 4-1 Adduct As shown by the above reaction mechanism, the cationic reaction to piperylene by such a mechanism yields an isomeric monoadduct having a structure different from the monoadducts derived by the corresponding free radical reactions. Similarly, in the case of isoprene the same rules apply with regard to the course of the reaction:

In the case of the terminally tetra-substituted butadiene, 2,5-dimethyl-2,4-hexadiene, cationic addition again led to the 2,1-adduct:

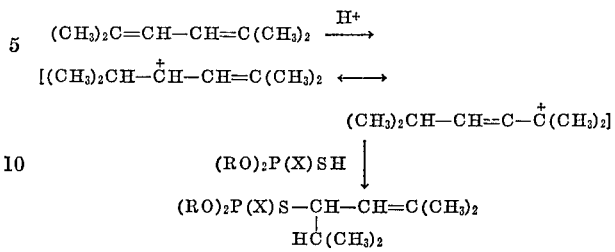

No allylic rearrangement to the 4,1-(=1,4-) adduct was observed. The 1,2-adduct of the corresponding free radical reaction was also absent.

As mentioned, thiophosphoric acids that can be employed in this invention have the generic formulae set forth above. In either Formula I or Formula II, R' and R" are preferably selected from the group consisting of $C_1$–$C_{30}$ alkyl, $C_6$–$C_{10}$ aryl, $C_7$–$C_{10}$ alkaryl and aralkyl, nitro substituted $C_6$–$C_{10}$ aryl, alkylmercapto substituted $C_6$–$C_{10}$ aryl and halosubstituted $C_6$–$C_{10}$ aryl and wherein R''' is preferably a $C_1$–$C_{30}$ alkylene or $C_6$–$C_8$ phenylene. Suitable examples of R' and R" include: methyl, ethyl, n-propyl, isopropyl, butyl, isobutyl, pentyl, decyl, dodecyl, eicosyl, etc. phenyl, ethyl phenyl, xylyl, naphthyl, 4-iodophenyl, 2-chlorophenyl, 3-bromophenyl, chlorotolyl, nitrophenyl, 2,5-dinitro-m-xylyl, 4-methylmercaptophenyl, and the like. Particularly preferred acids are those wherein R' and R" are the same and are $C_1$–$C_4$ alkyl, $C_6$–$C_9$ aryl and R''' is $C_1$–$C_5$ alkylene, e.g., ethylene, propylene, trimethylene, o-phenylene, etc.

The conjugated diolefins applicable to this invention generally have 4 to about 30 carbon atoms and may also be halo or cyano substituted. Preferably $C_4$–$C_{12}$ cyclic and acyclic compounds are employed. Examples of preferred diolefins are phenyl butadiene-1,3, butadiene-1,3, piperylene, isoprene, chloroprene, cyanoprene, 2,3-dimethyl butadiene-1,3, 2,3-dichlorobutadiene, cyclohexadiene-1,3, cyclopentadiene, methyl cyclopentadiene, 2,5-dimethyl hexadiene-2,4, other alkyl substituted dienes and chloro or nitro substituted dienes, and the like.

The cationic addition reaction is effected in the liquid phase in an acid medium. In certain instances, particu-

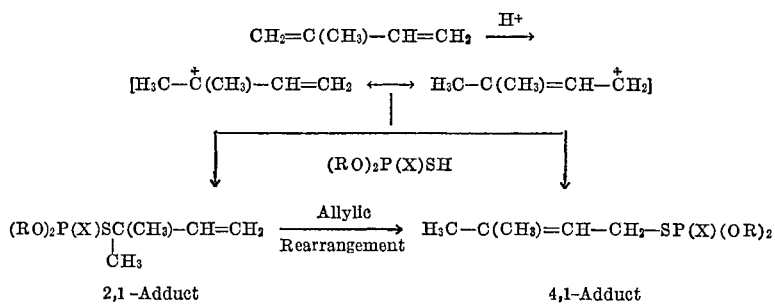

Indeed, cationic additions to isoprene give the corresponding 4,1-adduct isomers as main products in contrast to the free radical reactions.

It was found in the case of the cationic additions to isoprene that none of the 2,1-adduct could be isolated. This is attributed to its allylic rearrangement to the corresponding 4,1-adduct. Such a rearrangement is also catalyzed by the acidic catalysts of these cationic additions.

larly when the lower dialkyl thiophosphoric acids are utilized, e.g., dimethyl dithiophosphoric acid, the acid itself is strong enough to catalyze the cationic addition reaction. Nevertheless, it is preferred to employ cationic catalysts to promote the progress of the reaction. Generally, any acid having a $pK_a$ greater than the thiophosphoric acid added can be employed and the rate of reaction will increase as the strength of the acid increases.

Typical examples of the acids that can be employed are: mineral acids, e.g., perchloric, sulfuric, hydrochloric, phosphoric, polyphosphoric, etc.; Friedel-Crafts catalysts, e.g., boron trifluoride, aluminum chloride, bismuth chloride, zinc chloride, tellurium chloride, mercuric chloride, and the corresponding bromide, organic acids, e.g., methanesulfonic acid, p-toluenesulfonic acid, benzenesulfonic acid, trichloroacetic acid, trifluoroacetic acid, phenylphosphonic acid, acidic solids, e.g. such as sulfonic acid resins. Of the various acid media that can be employed perchloric acid and boron trifluoride are preferred. The acid is normally employed in catalytic amounts, i.e., 0.01 to about 10 wt. percent of the reaction mixtures, preferably 0.05 to 5 wt. percent.

Cationic reaction conditions generally employ temperatures ranging from about −80° C. to about +150° C., preferably 100° to 150° C. Elevated temperatures generally increase the rate of addition. Pressures may similarly vary widely and subatmospheric pressures, e.g., 0.5 atm., as well as superatmospheric pressures, e.g., 70 atm., may be employed. Since some of the diolefin reactants may be gaseous at the desired reaction temperature, superatmospheric pressures will then be employed. The molar ratio of thiophosphoric acid to diolefin is not critical and ratios of about 1:5 to 5:1 can be employed. Nevertheless, it is sometimes preferable to employ a slight excess of the thiophosphoric acid in order to drive the reaction to completion. Thus, molar ratios of 1:1 to 5:1, particularly 1:1 to about 2:1 are employed.

A molar excess of the monothiophosphoric acid is particularly advantageous because of the hydrogen bonding between the free acid and the adduct formed. For example, with the piperylene adduct the following complex is formed:

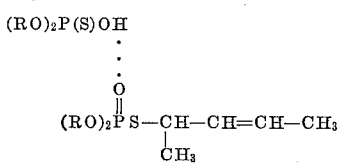

The monothiophosphoric acid is unreactive when so complexed. Thus to achieve complete conversion of the diene a molar excess of the monothiophosphoric acid is normally advantageous.

Solvents may be employed but are not necessary to the success of the reaction. Solvents that can be utilized are generally inert to the reactants and product, e.g., $C_6$–$C_{12}$ aromatics such as benzene, toluene, xylene, or ethers such as dialkyl ethers or cyclic ethers, the solvents also serving to reduce the vapor pressure of the diolefin. The mixing order is normally not critical and one skilled in the art will easily determine the best way to effect the reaction. For example, it may be advantageous to add the diolefin to the thiophosphoric acid to prevent polymerization of the diolefin, or, to add the thiophosphoric acid to the diolefin to prevent diaddition, when that possibility exists.

The reaction is normally carried out for a period of time sufficient to form a substantial amount of the monoadduct, e.g. 10 minutes to 100 hours, preferably 1–10 hours. The product can be recovered by known methods, e.g., fractional distillation, preferably under vacuum.

By following the procedures set forth hereinabove O, O′-dihydrocarbyl-S-allyl thiophosphates having the generic formulae shown by III and IV, above, may be prepared. Preferably, however, in Formulae III and IV, X is oxygen and the unsaturated allylic moiety, Y, may be represented as

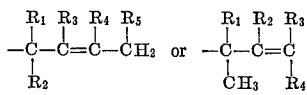

wherein $R_1$–$R_5$ are selected from the group consisting of $C_1$–$C_6$ alkyl, $C_6$–$C_{12}$ aryl, halogen, and hydrogen radicals, the halogen preferably being chlorine and the aryl preferably being a $C_6$ aryl. Additionally, cyclic moieties may also be obtained, such as:

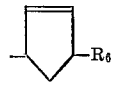

wherein $R_6$ may be a hydrogen or a methyl radical. More preferably, however, the lower alkyl derivatives of the monothiophosphoric acids are preferred, i.e., R′ and R″ of Formulae III and IV are $C_1$–$C_4$ alkyl. Particularly preferred compounds are the monoadducts of butadiene and dialkyl monothiophosphoric acid such as: The 1,4-adduct, S-crotyl dialkyl monothiophosphate; and the 2,1-adduct, S-2-(2-butenyl) dialkyl monothiophosphate.

While all of the above-mentioned compounds are biologically active, it has been surprisingly found that the dithiophosphoric acid adducts possess only nematocidal activity and very little, if any, insecticidal activity. To the contrary, however, the monothiophosphoric acid adducts are highly effective as insecticides while showing virtually no activity as nematocides. Particularly preferred for their pesticidal activity are the dimethyl monothiophosphoric acid monoadducts.

Pesticidal compositions prepared from these compounds may be employed in either solid or liquid form. Where used in solid form, they may be reduced to an impalpable powder and applied as an undiluted dust or mixed with a solid carrier such as clay, bentonite, talc, etc. The pesticidal compositions can also be applied as an atomized spray or in a liquid carrier either as a solution in a solvent or as an emulsion in a nonsolvent, e.g. water. In the diluted solid or liquid form, the compounds are employed in amounts of about 0.01 to about 5.0 wt. percent based on the inert carrier. Typical liquid solvents include acetone, ethyl alcohol, benzene, naphtha, etc. Suitable wetting agents are long chain alcohols, sulfonated amide or ester derivatives of fatty acids and petroleum sulfonates of $C_{10}$–$C_{20}$ nonionic emulsifying agents which are also employed in the pesticidal compositions. These compounds may also be admixed with carriers that are themselves pesticides.

EXAMPLE 1

Addition of dimethyldithiophosphoric acid to piperylene

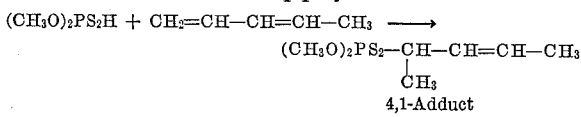

During a period of 20 minutes 47.6 g. (0.7 mole) of piperylene was added with magnetic stirring to 103.3 g. of 90% technical dimethyldithiophosphoric acid (equivalent to 0.6 mole). A spontaneous reaction was indicated by the rising temperature of the reaction mixture. After the reaction subsided the mixture was allowed to stand overnight. A nuclear magnetic resonance (n.m.r.) spectrum of a sample taken next day showed that the reaction was substantially complete. The n.m.r. has also indicated that 92% of the product formed was the 4,1-monoadduct, the expected compound from a cationic addition. A fractional distillation of the crude product yielded 110 g. (81%) of the colorless liquid adduct, boiling between 80–84° C. at 0.1 mm. pressure.

Analysis.—Calcd. for $C_7H_{15}O_2PS_2$ (percent): C, 37.17; H, 6.68; S, 28.34. Found (percent): C, 36.69; H, 6.51; S, 29.14.

EXAMPLE 2

Addition of diethyldithiophosphoric acid to piperylene

To 37.2 g. (0.2 mole) of diethyldithiophosphoric acid, 13.6 g. (0.2 mole) of piperylene was added dropwise with stirring, nitrogenation and ice-water cooling. The mixture was then allowed to stand for 3 days at room temperature. Subsequent n.m.r. analysis indicated that 73% of the 4,1-monoadduct has been formed. This has been confirmed by fractional distillation, which resulted in 38 g. (75%) of a colorless liquid adduct boiling at 81–83° C. at 0.01 mm. N.m.r. showed that the distilled product consisted of about 90% of the 4,1- and 5% of the 1,4-adduct.

*Analysis.*—Calcd. for $C_9H_{19}O_2PS_2$ (percent): C, 42.50; H, 7.52; P, 12.17; S, 25.22. Found (percent): C, 42.47; H, 7.74; P, 10.98; S, 25.40.

EXAMPLE 3

Addition of dimethyl monothiophosphoric acid to piperylene $(CH_3O)_2P(O)SH + CH_2=CH-CH=CH-CH_3 \longrightarrow (CH_3O)_2P(O)S-CH-CH=CH-CH_3$
$\qquad\qquad\qquad\qquad\qquad\qquad\qquad\qquad\qquad\qquad\qquad\qquad\qquad\qquad\quad |$
$\qquad\qquad\qquad\qquad\qquad\qquad\qquad\qquad\qquad\qquad\qquad\qquad\qquad\qquad\; CH_3$
4,1-Adduct To 14.2 g. (0.1 mole) of dimethyl monothiophosphoric acid was added dropwise with stirring and external cooling by a water bath 6.8 g. (0.1 mole) of piperylene. After 18 hours at ambient temperature, a 50% conversion to monoadduct was achieved as estimated by n.m.r. spectroscopy. Fractional distillation in vacuo gave 5.9 g. 29% of 4,1-adduct B.P. 70–1° at 0.05 mm.

*Analysis.*—Calcd. for $C_7H_{15}O_3PS$ (percent): C, 39.99; H, 7.19; S, 15.25. Found (percent): C, 38.84; H, 7.13; S, 15.19.

EXAMPLE 4

Addition of dimethyl dithiophosphoric acid to isoproprene $(CH_3O)_2PS_2H + CH_2=C(CH_3)-CH=CH_2 \longrightarrow (CH_3O)_2PS_2-CH_2-CH=C(CH_3)_2 + (CH_3O)_2PS_2-CH_2-C(CH_3)=CH-CH_3$
$\qquad\qquad\qquad\qquad\qquad\qquad\qquad\qquad\qquad\qquad\qquad\qquad\; $ 4,1-Adduct (Major) $\qquad\qquad\qquad\;$ 1,4-Adduct (Minor)

To 95.6 g. of ice-water cooled 90% dimethyl dithiophosphoric acid (0.55 mole). 43.6 g. (0.66 mole) isoprene was added slowly with stirring. After the ice melted, the mixture was allowed to stand for 2 hours at room temperature. A subsequent n.m.r. analysis of a sample indicated that no noticeable amount of the acid was left unconverted. N.m.r. also showed that the main product isomer, 63%, was the 4,1-monoadduct. A minor proportion, 27%, of the 1,4-adduct was formed. Via fractional distillation of the crude, 110 g. (90%) of purified adduct was obtained as a colorless liquid boiling between 81–86° C. at 0.1 mm.

*Analysis.*—Calcd. for $C_7H_{15}O_2PS_2$ (percent); C, 37.17; H, 6.68; P, 13.68. Found (percent): C, 36.81; H, 6.70; P, 13.62.

EXAMPLE 5

Addition of dimethyl monothiophosphoric acid to isoprene $(CH_3O)_2P(O)SH + CH_2=C(CH_3)-CH=CH_2 \longrightarrow (CH_3O)_2P(O)S-CH_2-CH=C(CH_3)_2$
$\qquad\qquad\qquad\qquad\qquad\qquad\qquad\qquad\qquad\qquad\qquad\qquad\qquad\qquad\quad$ 4,1-Adduct To 0.10 mole of dimethyl monothiophosphoric acid, 6.80 g. (0.1 mole) of isoprene is added dropwise with stirring and external cooling in a water bath to moderate the exothermic reaction. After 18 hours a 50% conversion of acid to monoadduct was estimated by n.m.r. spectroscopy. After the removal of the acid the crude product was purified by fractional distillation in vacuo to give 4.7 g. (23%) of product B.P. 65–70 at 0.2 mm. pressure. The n.m.r. indicated that at least 90% of the product was of the 4,1-adduct.

*Analysis.*—Calcd. for $C_7H_{15}O_3PS$ (percent): C, 39.98; H, 7.19; S, 15.25. Found (percent): C. 40.38; H, 7.48; S. 15.54.

EXAMPLE 6

Addition of dialkyl dithiophosphoric acids to chloroprene $(RO)_2PS_2H + CH_2=CCl-CH=CH_2 \longrightarrow$
$(RO)_2PS_2-CH_2-CCl=CH-CH_3 + (RO)_2PS_2-CH_2-CH=CCl-CH_3$
$\quad$ 1,4-Adduct (Major) $\qquad\qquad\qquad$ 4,1-Adduct (Minor)

To 0.25 mole distilled dialkyldithiophosphoric acid, 24.5 g. (0.275 mole) of chloroprene is added with stirring and running water cooling to moderate the exothermic reaction. After 24 hours, the extent of the addition reaction and the ratio of the isomeric monoadducts formed were estimated by n.m.r. spectroscopy. Then the crude products were fractionally distilled in vacuo. The data obtained are given in Table I. They show that the cationic additions provide the 1,4-monoadducts with high selectivity in good yields.

TABLE I

| Chloroprene adduct of dithiophosphoric acid $(RO)_2PS_2-CH_2-CCl=CH\cdot CH_3$ | Acid conversion after 24 hours, percent | Relative percent of adducts | | Yield of distilled adduct, percent | B.P range of adduct isomers, ° C./mm. |
|---|---|---|---|---|---|
| | | 1,4- | 4,1- | | |
| R— | | | | | |
| Methyl | 100 | 87 | 13 | 82 | 80–82/0.05 |
| Ethyl | 90 | 83 | 17 | 91 | 89–92/0.05 |
| Isopropyl | 50 | 82 | 18 | 88 | 89–92/0.01 |

EXAMPLE 7

Addition of dialkyl dithiophosphoric acids to cyclopentadiene

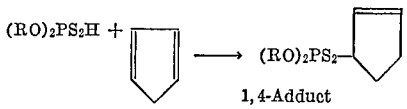
1,4-Adduct

To 0.25 mole of distilled dialkyl dithiophosphoric acid, 31.6 g. (0.2 mole) of cyclopentadiene was added slowly at −15° C. The reaction mixture was stirred in an ice bath to complete the reaction. The crude product was then evacuated to a pressure of 0.1 mm. with nitrogen bubbling to remove the excess cyclopentadiene. This procedure gave a quantitative yield of colorless liquid products, which were analyzed by n.m.r. and classical microanalytical methods. They were all found to be pure 1,4-monoadducts. Distillation of some of these adducts in vacuo was accompanied by some decomposition. Some of the characteristics of these reactions together with physical data of their products are given in Table II.

TABLE II.—CYCLOPENTADIENE ADDUCT OF DITHIOPHOSPHORIC ACID $(RO)_2PS_2-\langle\text{cyclopentadienyl}\rangle$

| R— | B.P. Range of adduct, ° C/mm. (dec.) |
|---|---|
| Methyl | 94–96/0.3 |
| Ethyl | 110–111/0.3 |
| Isopropyl | 115–117/0.3 |

EXAMPLE 8

Addition of dimethyl monothiophosphoric acid to cyclopentadiene $(CH_3O)_2P(O)SH + \langle\text{cyclopentadiene}\rangle \longrightarrow (CH_3O)_2P(O)S-\langle\text{cyclopentenyl}\rangle$ 1,4-Adduct Cyclopentadiene, 17.3 g. (0.26 mole) was added dropwise with stirring to 24.8 g. (0.175 mole) of dimethyl monothiophosphoric acid at 0°. The rate of addition was such that the internal temperature remained between 3 and 6°. After addition was complete the reaction was stirred at 0° for one hour and then at ambient temperature for 21 hours. A sample of the reaction mixture of this time indicated a 52% conversion to monoadduct. The crude reaction mixture was dissolved in 200 ml. of ether and washed with 5% sodium bicarbonate solution until the washings were basic. The ether layer was dried over sodium sulfate, filtered and evaporated at aspirator pressure at ambient temperature to yield 18.0 g. of yellow oil. The oil was then placed on high vacuum (0.1 mm.) for four hours at ambient temperature. The weight of crude product was 17.6 g. (48%). N.m.r. showed that it was essentially pure 1,4-adduct.

*Analysis.*—Calcd. for $C_7H_{13}PO_3S$ (percent): C, 40.37; H, 6.29; S, 15.40. Found (percent): C, 42.50; H, 6.63; S, 14.59.

EXAMPLE 9

Addition of dimethyl dithiophosphoric acid to butadiene at 60° C.

$(CH_3O)_2PS_2H + CH_2=CH-CH=CH_2 \longrightarrow (CH_3O)_2PS_2-CH_2-CH=CH-CH_3 + (CH_3O)_2PS_2-CH-CH=CH_2$
                                                                                                                    $|$
                                                                                                                    $CH_3$ 1,4-Adduct (Major)        2,1-Adduct (Minor)

A mixture of 126.4 (0.8 mole) of crude dimethyl dithiophosphoric acid (of 82% acid content) and 43.2 g. (0.8 mole) of butadiene was heated in a Pyrex-pressure tube in a 60° C. bath with magnetic stirring for 10 hours. The crude product formed was then sampled for n.m.r. spectroscopy which indicated a minimum of 90% conversion of the acid and a 9 to 1 ratio of the isomeric 1,4- and 2,1-adducts. The unreacted butadiene was flashed off. The residual liquid product (165 g.) was dissolved in ether (300 ml.), and washed twice with 100 ml. 5% aqueous sodium hydrogen carbonate solution to remove any unreacted acid. The ether solution was then concentrated at 40° C. under 25 mm. pressure yield 151 g. of a neutral product. The latter was fractionally distilled in vacuo to yield 135 g. (80%) of monoadduct, as a colorless liquid distilling at 77–79° at 0.2 mm. N.m.r. indicated thatt he adduct was composed of about 94% of the 1,4- and 6% of the 2,1-adduct.

*Analysis.*—Calcd. for $C_6H_{13}O_2PS_2$ (percent): C, 33.95; H, 6.17; P, 14.59. Found (percent): C, 33.98; H, 6.21; P, 14.43.

EXAMPLE 10

Addition of diethyl dithiophosphoric acid to butadiene at 75° C.

$(C_2H_5O)_2PS_2H + CH_2=CH-CH=CH_2 \longrightarrow$
$(C_2H_5O)_2PS_2-CH_2-CH=CH-CH_3$
$+ (C_2H_5O)_2PS_2-CH-CH=CH_2$
$|$
$CH_3$ 1,4-Adduct (Major)         2,1-Adduct (Minor)

A mixture of 37.2 g. (0.2 mole) of crude diethyl dithiophosphoric acid (of 90% acid content) and 10.8 g. (0.2 mole) of butadiene was reacted in the manner described in the previous example at 75° C. for 24 hours. Subsequent n.m.r. analysis indicated an essentially quantitative reaction. After the removal of all acidic components, 40 g. (92%) crude adduct was obtained. Its fractional distillation in vacuo gave 35 g. (81%) purified adduct containing 93%, 1,4- and 7% 2,1-isomer.

EXAMPLE 11

Addition of diisobutyl dithiophosphoric acid to butadiene at 75°

$[(CH_3)_2CHCH_2O]_2PS_2H + CH_2=CH-CH=CH_2 \longrightarrow$
$[(CH_3)_2CHCH_2O]_2PS_2-CH_2-CH=CH-CH_3$
1,4-Adduct Reaction of diisobutyl dithiophosphoric acid and butadiene under the conditions described in the previous example afforded the corresponding 1,4-adduct, B.P. 95–97° C. at 0.1 mm.

*Analysis.*—Calcd. for $C_{12}H_{25}O_2PS_2$ (percent): C, 48.62; H, 8.50; P, 10.45; S, 21.64. Found (percent): C, 48.48; H, 8.75; P, 10.32.

EXAMPLE 12

Addition of diethyl dithiophosphoric acid to butadiene in the presence of free radical inhibitor and cationic catalyst Experiments similar to the ones described in Example 14 were carried out substituting diethyl for dimethyl dithiophosphoric acid. However, in the absence of an added ionic catalyst diethyl dithiophosphoric acid is less reactive than dimethyl.

EXAMPLE 13

Addition of dimethyl dithiophosphoric acid to butadiene at room temperature

A mixture of 78.5 g. (0.5 mole) of dimethyl dithiophosphoric acid (purified by extraction) and 32.4 g. (0.6 mole) butadiene was kept in a pressure tube at room temperature. N.m.r. of a sample after 10 days indicated an essentially complete conversion of the acid and the pressure of the 1,4- and 2,1-adducts in a 45 to 55 ratio. After 63 days standing, however, the 1,4- versus 2,1-isomer ratio was 82 to 18, indicating considerable allylic rearrangement.

EXAMPLE 14

Addition of dimethyl dithiophosphoric acid to butadiene in the presence of free radical inhibitor and cationic catalyst Equimolar amounts, 0.2 mole each of dimethyl dithiophosphoric acid (purified by extraction) and butadiene were reacted in Pyrex-pressure tubes at room temperature in a series of experiments designed to study the effect of a radical inhibitor and an ionic catalyst on the addition reaction. In the first experiment, the reactants alone were stirred in a water bath. In the second experiment 0.002 mole (i.e., 2 mole percent) of methylhydroquinone was added to the reactants to inhibit the free radical type addition. Finally, in the third experiment 0.002 mole (i.e., 2 mole percent) of perchloric acid was used to catalyze the cationic type addition. The three Pyrex pressure tubes were periodically sample for n.m.r. spectroscopy in order to determine the progress ef the addition (with a ±10% accuracy) and the ratio of the isomeric adducts formed (with a ±5% accuracy). The data are given in Table III. The results of the first and second experiments are very similar. They indicate that the addition is ionic in character both in the presence and in the absence of the inhibitor. The primary product of the ionic addition is mostly the 2,1-isomer. This, however, is slowly isomerized to yield the 1,4-isomer. The third experiment indicates that perchloric acid is a very effective catalyst for both the addition and the subsequent rearrangement.

with 5% sodium carbonate until basic and then with water. The ethereal solution was dried over sodium carbonate and the solvent removed on a rotary evaporator. The crude product (13 g.) contained 75% of a mixture of the 2,1- and 1,4-adducts in a 4:5 ratio and 25% of diethyl-S-ethylthiophosphate.

An identical experiment at 60° C. resulted in 44.6% conversion of the acid. The acid free product mixture consisted of 78% of the 2,1- and 1,4-adducts in a 1:1 ratio and 22% of the diethyl-S-ethylthiophosphate.

EXAMPLE 17

Addition of dimethyl dithiophosphoric acid to 2,5-dimethyl-2-4-hexadiene $(CH_3O)PS_2H + (CH_3)_2C=CH-CH=C(CH_3)_2 \longrightarrow$

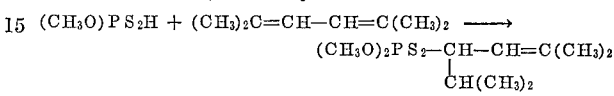

To 31.6 g. (0.2 mole) of crude dimethyl dithiophos-

TABLE III

| | No catalyst added | | | Methylhydroquinone (HQ) present | | | HQ and HClO₄ present | | |
|---|---|---|---|---|---|---|---|---|---|
| | Acid conversion, percent | Relative amounts of adducts present, percent | | Acid conversion, percent | Relative amounts of adducts present, percent | | Acid conversion, percent | Relative amounts of adducts present, percent | |
| Reaction time at 25° C. (50° C.), hours | | 2,1- | 1,4- | | 2,1- | 1,4- | | 2,1- | 1,4 |
| 1/6 | 0 | 0 | 0 | 0 | 0 | 0 | 18 | 20 | 80 |
| 2 | 9 | 71 | 29 | 12 | 75 | 25 | 85 | 32 | 68 |
| 72 | 64 | 78 | 22 | 65 | 79 | 21 | 78 | 43 | 57 |
| 96 | 77 | 66 | 34 | 80 | 67 | 33 | | | |
| 96 | 78 | 70 | 30 | 79 | 70 | 30 | 84 | 40 | 60 |
| 96 | 81 | 63 | 37 | 82 | 65 | 35 | 85 | 37 | 63 |

EXAMPLE 15

Addition of dimethyl monothiophosphoric acid to butadiene $(CH_3O)_2P(O)SH + CH_2=CH-CH=CH_2 \longrightarrow$

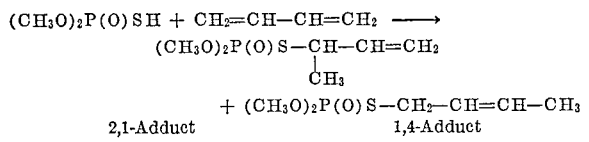

A mixture of 16.2 g. (0.11 mole) of diethyl monothiophosphoric acid, 5.4 g. 0.1 mole) of butadiene and 0.114 g. (0.001 mole) of hydroquinone stirred in a pressure tube at ambient temperature for 135 hours. Subsequent analysis by n.m.r. indicated 26% conversion to a mixture of 2,1- and 1,4-adducts. The crude reaction product was dissolved in 100 ml. of ether. The ether was washed with 2× 100 ml. portions of 5% sodium bicarbonate solution and then dried over sodium sulfate. The sodium sulfate was removed by filtration and the ether evaporated at aspirator pressure at ambient temperature. The residue was distilled to give 2.84 g. of product as a colorless liquid, B.P. 63–8° at 0.28 mm. pressure. Analysis of the distillate by n.m.r. indicated that it was a 64:36 mixture of 2,1- and 1,4-adducts.

*Analysis.*—Calcd. for $C_6H_{13}O_3PS$ (percent): C, 36.72; H, 6.67; S, 16.34. Found (percent): C, 36.74; H, 6.76; S, 16.61.

EXAMPLE 16

Addition of diethyl monothiophosphoric acid to butadiene $(C_2H_5O)_2P(O)S-CH_2-CH=CH-CH_3$
$+ (C_2H_5O)_2P(O)S-\underset{\underset{CH_3}{|}}{CH}-CH=CH_2$ Diethyl monothiophosphoric acid (34 g.; 0.2 mole), methyl hydroquinone (0.25 g.; 0.002 mole) and 0.15 ml. of 72% aqueous perchloric acid (0.002 mole) were placed into a 100 ml. Pyrex tube containing a magnetic stirring bar. The tube was immersed in a Dry Ice isopropanol bath, evacuated, and 16.6 ml. (0.2 mole) of butadiene condensed into it. The sealed tube was then stirred at ambient temperature and periodically sampled for n.m.r. analysis. A conversion of 31% of the acid was realized after 138 hours. The excess butadiene was then released and the residue was dissolved in ether, washed phoric acid having an acid content of 82% 22g. (0.2 mole) of 2,5-dimethyl-2,4-hexadiene was added with stirring and ice-cooling under nitrogen. The reaction was then allowed to proceed at room temperature. An n.m.r. spectrum after 5 hours showed 52% conversion to the 2,1-adduct. After 3 days a conversion of 67% was observed. Subsequent removal of the volatiles with a 55° C. bath at 0.05 mm. resulted in 46 g. of a residual product, which on the basis of its n.m.r. spectrum contains 90% of 2,1-adduct. After the removal of the unconverted acid by washing the residue with aqueous sodium hydrogen carbonate solution, fractional distillation yielded a purified, clear, colorless liquid product, B.P. 80–83° at 0.05 mm.

*Analysis.*—Calcd. for $C_{10}H_{21}O_2PS_2$ (percent): C, 44.76; H, 7.88; P, 11.54; S, 23.90. Found (percent): C, 44.47; H, 7.74; P, 11.41; S, 23.70.

EXAMPLE 18

Addition of di-4-chlorophenyl dithiophosphoric acid to piperylene

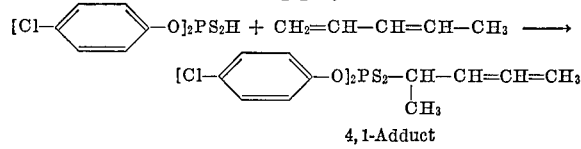

To 3.5 g. (0.05 mole) of piperylene 17.6 g. (0.05 mole) of di-4-chlorophenyl dithiophosphoric acid was added dropwise with stirring. An immediate, exothermic reaction was observed when starting the addition. The reaction mixture was therefore cooled to keep the temperature below 50° C. An n.m.r. spectrum of the resulting crude product indicated the formation of the 4,1-adduct.

EXAMPLE 19

Addition of trimethylene dithiophosphoric acid to piperylene

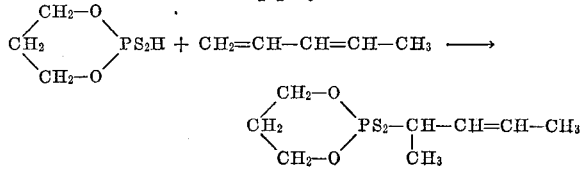

To 4.25 g. (0.025 mole) of trimethylene dithiophosphoric acid, 1.8 g. (0.026 mole) of piperylene was added slowly with stirring and ice-water cooling. When the exothermic reaction was completed, the crude product was examined by n.m.r. spectroscopy. The characteristic proton resonances indicated that a 1,4-adduct was formed.

EXAMPLE 20

Dialkyl dithiophosphoric acid-conjugated diene adducts as oil additives

Some of the new dithiophosphoric acid-conjugated diene adducts were examined as lubricating oil additives in a few routine laboratory tests. The tests selected were an Oxidation Stability Test, a 4-Ball Wear Test and an Extreme Pressure Test.

The base oil used in all these tests was an HD-30 lubricating oil, i.e., S.A.E. 30 Grade 100 V.I. oil from a Mid-Continent Base Stock. In most of these tests, the compounds to be tested as additives were dissolved in the base oil to give a test oil containing 0.1% phosphorus. As a standard commercial additive for comparison, a zinc salt of a mixture of isobutyl- and n-amyl-dithiophosphoric acids was used.

In the Oxidation Stability Test the heated oil was aerated in the presence of silver and copper-lead specimens attached to a shaft spun at a rate of 600 r.p.m. The extent of oxidation was measured by the increase of the viscosity of the oil. The corrosivity of the oxidized oil showed up as a weight change in the metallic specimens.

The 4-Ball Wear Test (H. L. West, J. Inst. Pet., 32, 210, 222 (1946)) is used for the characterization of hydrodynamic lubrication of steel surfaces by the oil. In the test, three steel balls are placed in a fixed triangular position and a fourth is mounted above them. The fourth ball is mounted in a chuck so that the assembly can be rotated under pressure while lubricated with the oil to be tested. The tests were carried out at a rotational speed of 1800 r.p.m. under 10 kg. pressure at 150° C. for 30 minutes. Then the balls were microscopically examined for scar diameters which are, of course, directly proportional to the wear.

In the Regular Extreme Pressure Test Load Bearing Capacity S.A.E. Federal Test Method 6501.02 (15.15.1955) two lubricated metallic surfaces were turned over each other at a rate of 1000 r.p.m. with 3.4/1 rubbing ratio under increasing pressure until seizure occurred.

Table IV shows the results of these tests with the diisopropyldithiophosphoric acid adducts of butadiene and chloroprene. The data indicate that the effectiveness of both compounds is comparable to that of a zinc dialkyldithiophosphate type additive in these tests. The lower dialkyl, i.e., diethyl- and dimethyl-, dithiophosphoric acid adducts of chloroprene show a decreasing antiwear but an increasing extreme pressure effect. The extreme pressure effect somewhat parallels the corrosivity towards copper-lead bearings. Corrosivity is expected in the case of chloride compounds due to the possibility of hydrogen chloride formation under the test conditions. In this respect it is interesting to observe that the chloroprene-adducts having a vinylic chlorine atom show little corrosion problem compared with the adduct of the polycyclic hydrocarbon, aldrin which contains labile chlorine atoms.

TABLE IV

| | Lube oil oxidation stability test | | | | | |
|---|---|---|---|---|---|---|
| | Kinematic viscosity (Saybolt), seconds | | Weight change of metal, mg. | | 4-ball wear test, wear diameter, microns | Extreme pressure test, max. pressure, lbs. |
| Experimental compound examined [1] | Initial | After oxidation | Silver | Cu/Pb bearing | | |
| Base oil, no phosphus compound | 148 | 381 | −2 | −309 | 0.407 | 1,100 |
| Zinc dialkyldithiophosphate | 149 | 161 | −1 | −16 | 0.266 | 1,600 |
| $(i\text{-}C_4H_9)_2PS_2CH_2CH=CHCH_3$ | 146 | 165 | −34 | −69 | 0.313 | 2,000 |
| $(i\text{-}C_3H_7O)_2PS_2CH_2CCl=CHCH_3$ | 146 | 158 | −74 | −11 | 0.264 | 2,950 |
| $(C_2H_5O)_2PS_2CH_2CCl=CHCH_3$ | 145 | 161 | +1 | −7 | 0.360 | 3,150 |
| $(CH_3O)_2PS_2CH_2CCl=CHCH_3$ | 146 | 17 | +7 | −98 | 0.330 | 3,250 |
| $(C_2H_5O)_2PS_2H+\text{Aldrin adduct}$ | 149 | 365 | −8 | −480 | 0.683 | 3,450 |

[1] Adduct structure (main isomer 1,4-, 0.1% P).

EXAMPLE 21

Dialkyldithiophosphoric acid-conjugated diene adducts as pesticides

Some of the new conjugated diene adducts were screened for pesticidal activity against house flies (*Musca domestica*, Linnaeus), Southern armyworms (*Prodenia eridania*, Cramer), Mexican bean beetle (*Epilachna varivestis*, Mulsant), pea aphid (*Macrosiphum pisi*) mites (*Tetranychus atlanticus*, McGregor) and root knot nematodes (*Meloidigyne sp.*) using the following test procedures.

A tenth of a gram of each sample was dissolved in 2 ml. acetone and emulsified with 0.2 ml. of Triton X-100 in 200 ml. distilled water for a 0.05% spray.

In the housefly tests, 50 adults are sprayed in a 2 in. x 5 in. stainless steel cage faced on top and bottom with 14 mesh screen. Mortality determinations are made after 24 hours.

In the armyworm and bean beetle tests, lima bean leaves sprayed on the dorsal and ventral surfaces are offered to 10 larvae of the armyworm (late third instar) and the bean beetle (late second instar) for a 48-hour feeding period.

In the contact pea aphid tests, adult pea aphids are sprayed and transferred to sprayed pea plants and held for 48 hours mortality determinations. The systematic aphicidal activity is evaluated by applying the spray to the vermiculite substratum of potted pea plants. Forty-eight hours after application the plants are infested with 10 adult pea aphids and mortality determination is made after 5 days.

In the spider mite tests, lima bean plants are infested with 50–100 adults of the strawberry spider mite prior to testing. The infested plants are dipped into the test emulsion and held for 5 days. Adult mortality is determined thereafter.

In the routine nematocide testing 0.41 g. test sample per gallon of soil, equivalent to 100 lbs. per 4 inch acre, is first formulated into a 10% dust, then blended thoroughly in a V-shell blender with soil inoculated with infected soil and root knots from infected tomato plants. Four one pint paper pots are used for each treatment with one tomato transplant per pot. After 3 to 4 weeks under artificial light and overhead irrigation, the roots of the plants are examined for degree of root knot formation. Inoculated controls normally have about 50–100 root knots per plant. Percent control is determined by comparison of the root counts on treated and untreated plants. In a modified test procedure, mainly used for compounds with high vapor pressure, the test sample is dissolved in 3 ml. acetone and then inserted into the soil placed into a glass container. The container then is immediately closed and kept sealed for 5 days. Thereafter, the container is rotated on a ball-mill for 5 minutes and held for an additional 2 days before potting and planting of tomato plants.

The results recorded in Table V show that, in general, the adducts are biologically active. Several of them were found to be effective aphicides at the 0.05% application rate.

A few interesting observations can be made with regard to structure versus biological activity in this series. The dimethyldithiophosphoric acid adducts are more effective than the corresponding diethyl derivatives. The dimethyldithiophosphates have a more definite systemic action. In this group of compounds the increasing methyl substitution seems to affect the pesticidal effectiveness in an adverse manner. Chlorine substitution resulted in a loss of the systemic mode of action. Shift of the double bond from β-(allylic) to γ-position decreased the general pesticidal activity. In general, the dialkylmonothiophosphoric acid adducts are more active insecticides than the corresponding dithiophosphoric acid adducts.

The nematocidal test data indicate that these compounds, as expected from their intermediate volatility, are active by both the regular and modified tests at the 100 lbs. per acre application rate. Also the dimethyl dithiophosphoric acid adducts show a surprising nematocidal activity as contrasted to their homologues and analogues.

a liquid phase, a thiophosphoric acid, said acid being one selected from the group consisting of:

$$\text{(I)} \quad \begin{matrix} R'O \\ \phantom{P} \\ R''O \end{matrix} \!\!\!\! \begin{matrix} X \\ \| \\ P-SH \end{matrix} \quad \text{and} \quad \text{II.} \quad \begin{matrix} O \\ \phantom{P} \\ R''' \end{matrix} \!\!\!\! \begin{matrix} X \\ \| \\ P-SH \end{matrix}$$

wherein R' and R" are each selected from the group consisting of $C_1$-$C_{30}$ alkyl, $C_6$-$C_{10}$ phenyl, $C_7$-$C_{10}$ alkaryl and aralkyl, $C_6$-$C_{10}$ chloro, bromo and iodo substituted aryl, $C_6$-$C_{10}$ nitro-substituted aryl, $C_6$-$C_{10}$ alkylmercapto substituted aryl; R''' is a divalent hydrocarbyl radical; said radical being one selected from the group consisting of $C_1$-$C_{30}$ alkylene and $C_6$-$C_8$ phenylene; and X is selected from the group consisting of sulfur and oxygen with a $C_4$-$C_{12}$ cyclic or acyclic conjugated diolefin, said reaction being conducted in the presence of a cationic catalyst having a $pK_a$ value greater than that of the thiophosphoric acid.

7. The process of claim 6 wherein the diolefin is selected from the group consisting of $C_4$-$C_{12}$ conjugated diolefins and chloro and cyano substituted derivatives thereof.

TABLE V.—PESTICIDAL FFECT OF DITHIOPHOSPHORIC ACID-DENE MONOADDUCTS IN PRELIMINARY SCREENING

| Experimental compound examined | | Mortality produced by 0.05% spray, percent | | | | | | Nematode control, percent, 100 lbs./acre | |
|---|---|---|---|---|---|---|---|---|---|
| Adduct structure ($CH_3$=Me; $C_2H_5$=Et) | Main isomer, (percent) | House flies, 24 hrs. | Army-worms, 48 hrs. | Bean beetles, 48 hrs. | Pea aphids Contact, 48 hrs. | Pea aphids Systemic, 5 days | Mites contact, 5 days | Regular | Modified |
| $(MeO)_2PS_2CH_2CH=CHMe$ | >95 | 0 | 0 | 0 | 100 | 100 | 61 | 100 | 100 |
| $(MeO)_2P(O)SCH_2CH=CHMe$ | >95 | 100 | 0 | 100 | 100 | 100 | 18 | | |
| $(EtO)_2PS_2CH_2CH=CHMe$ | >95 | 4 | 0 | 80 | 90 | 90 | 92 | 50 | 0 |
| $(EtO)_2P(O)SCH_2CH=CHMe$ | | 98 | 0 | 20 | 20 | 90 | 50 | | |
| $(EtO)_2PS_2CH_2CH_2CH=CH_2$ | 99 | 18 | 0 | 0 | 0 | 0 | 20 | | |
| $(MeO)_2PS_2CH(Me)CH=CHMe$ | >95 | 0 | 0 | 0 | 0 | 50 | 0 | 40 | 20 |
| $(MeO)_2PS_2CH_2CH=CHMe_2$ | 65 | 0 | 0 | 50 | 50 | 100 | 13 | 92 | 25 |
| $(EtO)_2PS_2CH_2CMe=CHMe$ | 78 | 0 | 0 | 10 | 70 | 70 | | | 0 |
| $(EtO)_2PS_2CH_2CMe=CMe_2$ | >98 | 0 | 0 | 10 | 0 | 0 | 0 | 0 | 0 |
| $(MeO)_2PS_2CH_2CCl=CHMe$ | 85 | 32 | 0 | 100 | 100 | 0 | 0 | 100 | 100 |
| $(EtO)_2PS_2CH_2CCl=CHMe$ | 85 | 20 | 0 | 0 | 60 | 0 | 0 | 50 | 0 |
| $(EtO)_2PS_2CMe_2CH_2CH=CMe_2$ | 84 | 0 | 0 | 10 | 0 | 0 | 27 | 0 | 0 |

What is claimed is:

1. A compound having the generic formulae selected from the group consisting of:

$$\begin{matrix} R'O \\ \phantom{P} \\ R''O \end{matrix} \!\!\!\! \begin{matrix} O \\ \| \\ P-S-Y \end{matrix} \quad \text{and} \quad \begin{matrix} O \\ \phantom{P} \\ R''' \end{matrix} \!\!\!\! \begin{matrix} O \\ \| \\ P-S-Y \end{matrix}$$

wherein R' and R" are each selected from the group consisting of $C_1$-$C_{30}$ alkyl, $C_6$-$C_{10}$ phenyl, $C_7$-$C_{10}$ alkaryl and aralkyl, $C_6$-$C_{10}$ chloro, bromo and iodo substituted aryl, $C_6$-$C_{10}$ nitro substituted aryl, $C_6$-$C_{10}$ alkyl mercapto substituted aryl; R''' is a divalent hydrocarbyl radical; being one selected from the group consisting of $C_1$-$C_{30}$ alkylene and $C_6$-$C_8$ phenylene; and Y is a allylic radical being one selected from the group consisting of:

$$\begin{matrix} R_1 & R_3 & R_4 & R_5 \\ | & | & | & | \\ -C-C=C-CH_2 \\ | \\ R_2 \end{matrix} \quad \text{and} \quad \begin{matrix} R_1 & R_2 & R_3 \\ | & | & | \\ -C-C=C \\ | & | \\ CH_3 & R_4 \end{matrix} \quad \text{and} \quad \bigcirc\!\!-R_6$$

wherein $R_1$ to $R_5$ are each selected from the group consisting of $C_1$-$C_6$ alkyl, $C_6$-$C_{12}$ aryl and hydrogen and $R_6$ is either hydrogen or methyl.

2. The compound of claim 1 wherein R' and R" are each selected from the group consisting of $C_1$-$C_4$ alkyl and $C_6$-$C_9$ aryl and R''' is a $C_1$-$C_5$ alkylene.

3. S-crotyl dimethyl monothiophosphate.

4. S-2-(3-butenyl) dimethyl monothiophosphate.

5. S-2-(3-butenyl) diethyl monothiophosphate.

6. A process for preparing cationic monoadducts of thiophosphoric acids, said process comprising reacting in 8. The process of claim 6 wherein R' and R" are each selected from the group consisting of $C_1$-$C_4$ alkyl and $C_6$-$C_9$ aryl, and R''' is a $C_1$-$C_5$ alkylene radical.

9. The process of claim 6 wherein the molar ratio of thiophosphoric acid to conjugated diolefin is about 1:5 to 5:1.

10. The process of claim 6 wherein X is sulfur and the reaction temperature ranges from 100 to about 150° C.

11. The process of claim 6 wherein the conjugated diolefin is a $C_4$-$C_{12}$ acyclic compound.

12. The process of claim 6 wherein the conjugated diolefin is butadiene.

13. The process of claim 6 wherein the conjugated diolefin is chloroprene.

14. The process of claim 6 wherein said cationic catalyst is one selected from the group consisting of perchloric acid and boron trifluoride.

15. The process of claim 6 wherein X is oxygen and the reaction temperature ranges from about −80° C. to about +150° C.

16. The process of claim 15 wherein temperature ranges from 100 to about 150° C.

17. The process of claim 15 wherein the molar ratio of thiophosphoric acid to conjugated diolefin is in excess of 1:1.

References Cited

UNITED STATES PATENTS 2,892,751  6/1959  Saul _____ 260—956X
3,340,332  9/1967  Oswald et al. _____ 260—956

CHARLES B. PARKER, Primary Examiner

A. H. SUTTO, Assistant Examiner

U.S. Cl. X.R.

252—46.6, 46.7; 260—936, 937, 978; 424—209, 219